United States Patent [19]
Söker et al.

[11] Patent Number: 5,878,199
[45] Date of Patent: Mar. 2, 1999

[54] METHOD FOR ASSEMBLING SIGNATURES

[75] Inventors: Wilfried Helmut Söker, Altenstadt; Joachim Josef Eugen Bader, Karben, both of Germany

[73] Assignee: Linotyoe-Hell AG, Eschborn, Germany

[21] Appl. No.: 765,529

[22] PCT Filed: Apr. 23, 1996

[86] PCT No.: PCT/DE96/00707

§ 371 Date: Mar. 20, 1997

§ 102(e) Date: Mar. 20, 1997

[87] PCT Pub. No.: WO96/34359

PCT Pub. Date: Oct. 31, 1996

[30] Foreign Application Priority Data

Apr. 24, 1995 [DE] Germany ............... 195 14 293.4

[51] Int. Cl.$^6$ ............................................. G06K 15/00
[52] U.S. Cl. .................... 395/117; 395/114; 707/517; 707/525; 707/910
[58] Field of Search ................... 395/101–117; 707/500, 517, 520, 523, 525, 526, 527; 345/147–149, 202

[56] References Cited

U.S. PATENT DOCUMENTS

| 4,928,252 | 5/1990 | Gabbe et al. | 395/102 |
|---|---|---|---|
| 5,125,072 | 6/1992 | Ng | 395/112 |
| 5,129,048 | 7/1992 | Ng | 395/110 |
| 5,463,720 | 10/1995 | Granger | 395/110 |
| 5,502,804 | 3/1996 | Butterfield et al. | 707/502 |
| 5,509,115 | 4/1996 | Butterfield et al. | 395/116 X |
| 5,748,860 | 5/1998 | Shively | 395/114 |
| 5,752,057 | 5/1998 | Lifshitz et al. | 707/523 |

FOREIGN PATENT DOCUMENTS

| 0 557 008 A2 | 8/1993 | European Pat. Off. . |
|---|---|---|
| 0 574 224 A2 | 12/1993 | European Pat. Off. . |
| 0 590 600 A2 | 4/1994 | European Pat. Off. . |
| WO 95/07506 | 9/1994 | WIPO . |
| WO 95/07507 | 9/1994 | WIPO . |

*Primary Examiner*—Joseph H. Feild
*Attorney, Agent, or Firm*—Hill & Simpson

[57] ABSTRACT

A method for electronic assembly of signatures where individual printed pages are assembled to form a signature. Contents of the printed pages to be assembled are described in a page description language. Contone Contone maps in which the printed pages are described pixel-by-pixel and line-by-line in the form of gray scale values are generated for the individual printed pages by interpretation of page descriptions in at least one interpreter. The contone maps of the individual printed pages are assembled to form an overall contone map in a raster generator such that lines of the overall contone map of the signature are composed from individual lines of the contone maps of the printed pages taking predetermined parameters into consideration. The overall contone map of the signature is converted into a screened bit map in the raster generator. The signature is recorded pixel-by-pixel and line-by-line on a recording medium based on the bit map.

10 Claims, 5 Drawing Sheets

METHOD FOR ASSEMBLING SIGNATURES

BACKGROUND OF THE INVENTION

The invention is in the field of electronic reproduction technology and is directed to a method for the electronic assembly of signatures in a raster generator from a plurality of printed pages that are present as high-resolution contone map.

In reproduction technology, printer's copies that contain all elements to be printed such as texts, graphics and images are generated for printed pages. A separate printer's copy that contains all elements that are printed in the respective color is generated for each ink in chromatic printing. For four-color printing, these are the inks cyan, magenta, yellow and black (C, M, Y, K). The printer's copies separated according to inks are also called color separations. The printer's copies are usually screened and exposed on films with high resolution that are then further-processed for the production of printing forms (printing plates, printing cylinders). Alternatively, the printer's copies can also be directly exposed on printing plates in special recorders. For checking the content and the colors of the printed pages, printer's copies are exposed in proof recorders with a recording process that simulates the printing process in a chromatic output.

Figure 1:
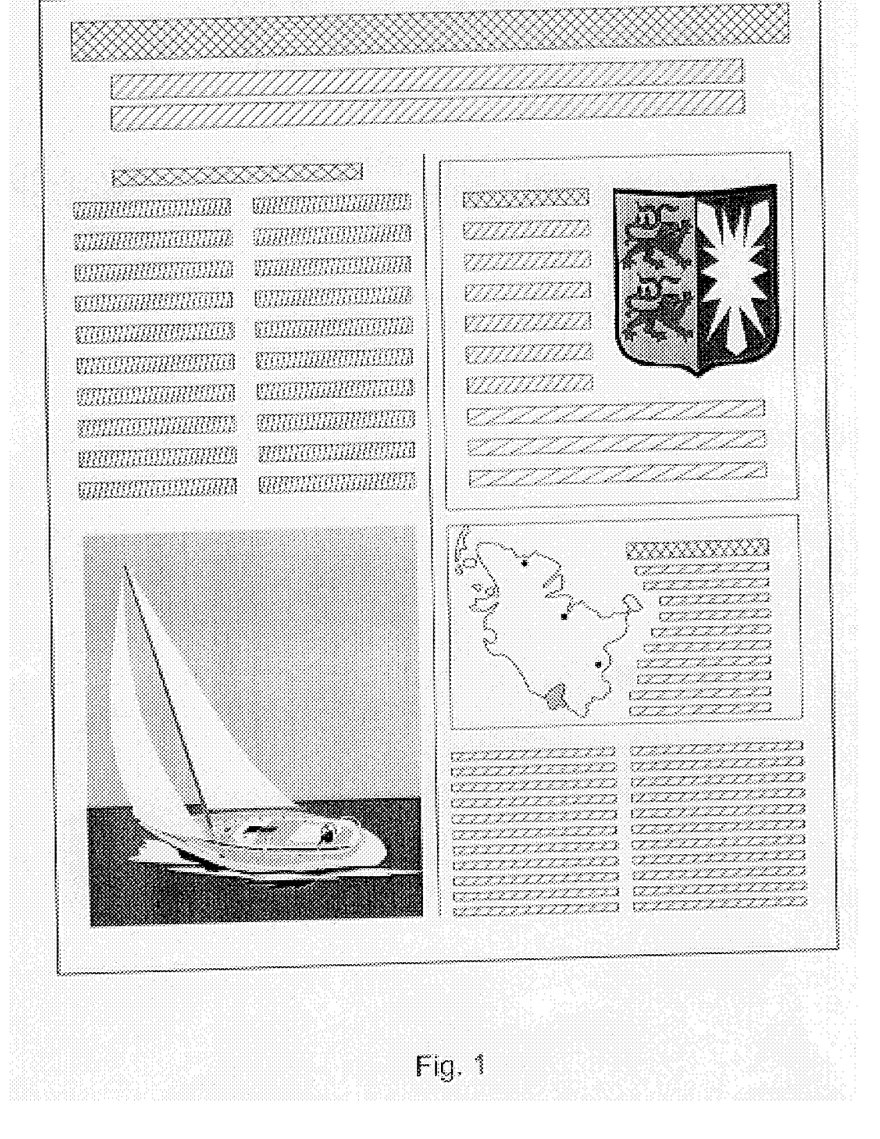
FIG. 1 is an example of a printed page with text, graphics and image elements (prior art)
Figure 2:
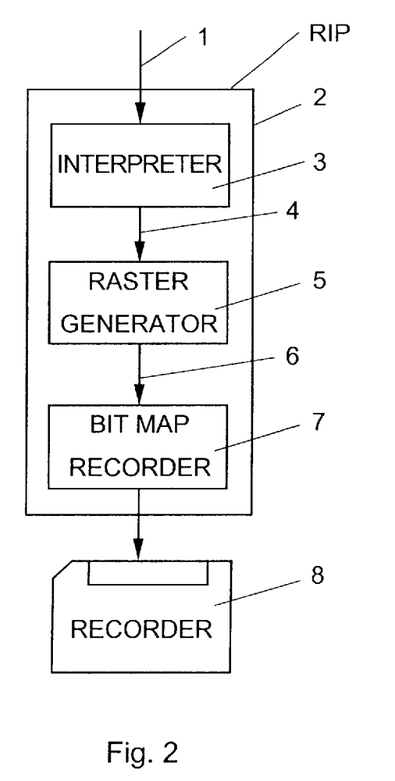
FIG. 2 shows the work execution in the exposing of PostScript data according to the prior art.

FIG. 2 shows the work sequence that was previously mainly employed in the prior art in the exposure of printer's copies for printed pages that had been generated in the page description language PostScript. PostScript data 1 are supplied to a raster image processor (RIP) (2) that can be a computer specifically optimized for this job or a program on a standard computer. PostScript data 1 for every color separation are normally generated in a pre-process for every color separation of a printed page and are forwarded to the RIP (2) (separated PostScript). Alternatively, a chromatic printed page can also be generated in a single PostScript dataset (composite PostScript). The case of separated PostScript data 1 shall be explained in greater detail below.

Figure 3:
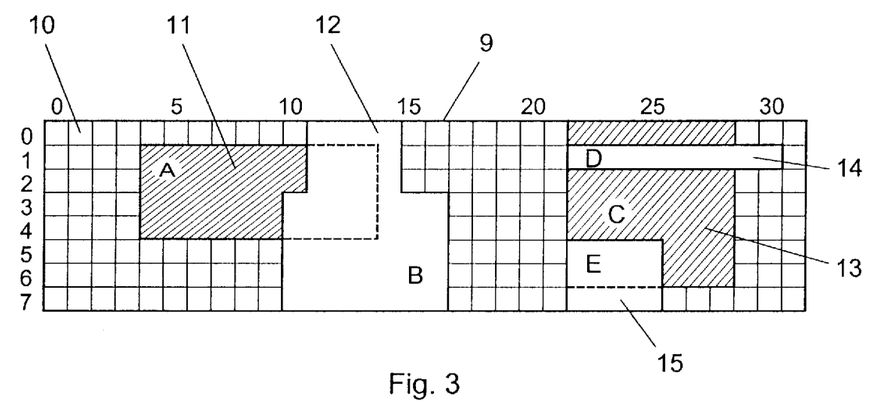
FIG. 3 shows an excerpt from a band with objects that the interpreter generates (prior art)

In a first step, the PostScript data 1 are analyzed in an interpreter 3 and resolved into a sequence of simple graphic objects. For that purpose, the printer's copy is divided into horizontal strips (bands) that are successively processed. FIG. 3 shows a band excerpt 9 with a few objects generated by the interpreter. The band excerpt 9 is divided into recording pixels 10. In the example of FIG. 3, the band excerpt is 8 pixels high, numbered from 0 to 7, and 32 pixels wide, numbered from 0 to 31. The resolution can be symmetrical (the same in horizontal and vertical direction) or asymmetrical, for example twice as great horizontally as vertically. The objects A through E (11,12,13,14,15) describe sub-segments of text, graphics or image elements that fall within the band excerpt 9.

The interpreter outputs the objects A through E (11,12,13,14,15) in a data format that is referred to as display list 4 (FIG. 2). For each object, the data format describes its geometrical shape and the gray scale value with which it is filled. The objects A through E (11,12,13,14,15) appear successively in the display list 4 in the sequence in which the corresponding page elements are described in the PostScript data. Objects that appear later in the display list (4) can thereby partly or entirely cover objects that appeared earlier in the display list 4. In the example of FIG. 3, the object A 11 is partly covered by the object B 12. Likewise, the objects D 14 and E 15 cover the object C.

In a further step in the RIP 2, the display list 4 is supplied to a raster generator 5 that successively converts the objects of the display list 4 into surfaces filled with raster points and enters them into a bit map memory 7 as bit map data 6. The raster point size is thereby varied dependent on the gray scale value of the object in the display list 4. The bit map data 6 of objects that appear later in the display list 4 respectively overwrite the corresponding areas of the bit map memory 7. After all objects of a band have been rastered by the raster generator 5 and written into the bit map memory 7, the content of the bit map memory 7 is forwarded as control signal values to the recorder 8 and exposed thereat.

Figure 4A:
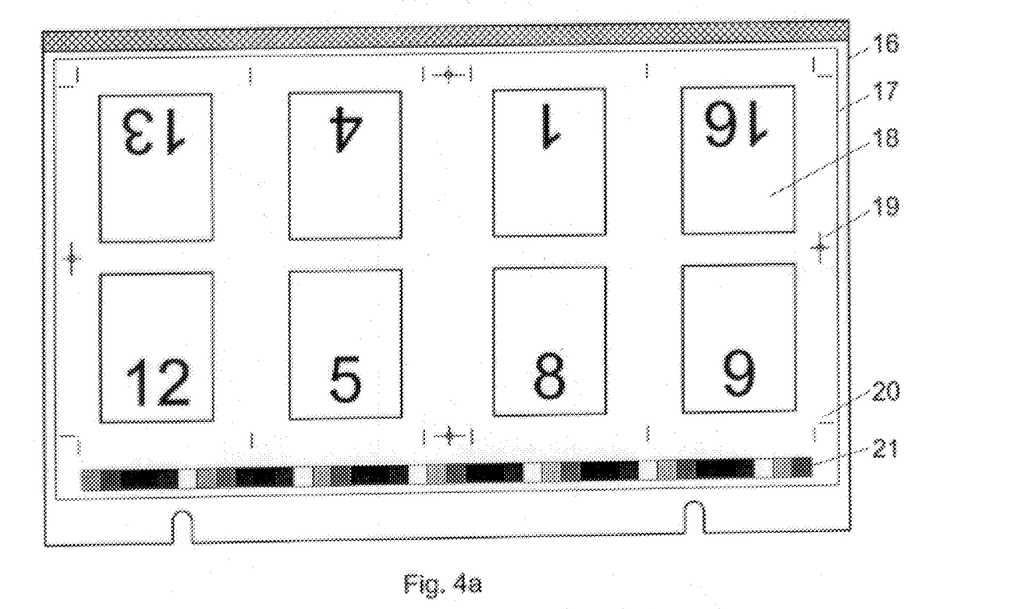
FIGS. 4a–4b are an example of imposition patterns of a 16-page brochure (prior art)
Figure 4B:
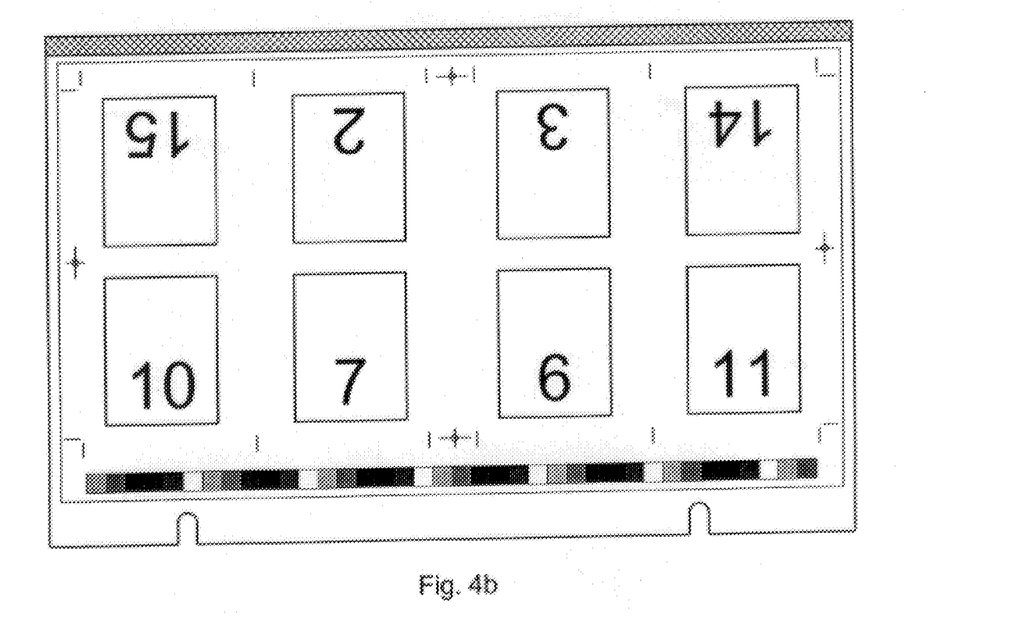

As a rule, it is not only one but a plurality of printed pages at once that are printed with a printing plate, these being arranged such that the area of the printing plate is used well and such that, after folding and cutting the printed paper sheet, the printed pages yield a brochure, a leaflet or the like. For that purpose, the printed pages that are to be printed on the paper sheet in the same printing event are combined in a signature. The arrangement of the printed pages in a signature is referred to as an imposition pattern. As an example, FIGS. 4a and 4b show the imposition patterns for a brochure with 16 printed pages. FIG. 4a shows a printing plate 16 on which a signature 17 is arranged. The signature 17 unites all elements to be printed, i.e. the printed pages 18 and auxiliary elements such as register marks 19, fold and cut marks 20 and print control strips 21. These auxiliary elements serve for quality control during printing and for simplifying the further-processing (folding, cutting, binding). The numbers in the printed pages 18 in the imposition pattern identify which page of the brochure is printed at which location of the signature. Numbers that are upside down identify pages that are printed upside down. FIG. 4a shows the pattern that is printed on the recto of the paper sheet (obverse) and FIG. 4b shows the pattern that is printed on the verso of the same paper sheet (reverse). With the imposition pattern of FIGS. 4a and 4b, the pages are arranged continuously in the brochure after the printing of both sides of the paper sheet and after the folding and cutting.

In the prior art, there are two essential methods for assembling pages that are present as PostScript data to form a signature, manual assembly and electronic assembly of the PostScript data. In manual assembly, the PostScript data of all pages are first interpreted in a RIP, and the color separation films of the pages are exposed on a recorder, as shown in FIG. 2. 64 color separation films thus arise in the example of the brochure with 16 pages (16 pages×4 inks). Eight printing plates each having Eight pages are required for the printing (4 respective inks for the obverse and the reverse). Given manual assembly of the 8 signatures, 8 color separation films of the pages per signature must be glued onto a transparent film having the size of the signature according to the arrangement of the imposition pattern, for example the cyan films of pages 1,4,5,8,9,12,13,16 according to the imposition pattern of FIG. 4a. The films of the other inks are likewise respectively glued onto a large assembly film according to the same pattern. One proceeds accordingly for the color separation films of pages 2,3,6,7,10,11,14,15 but according to the imposition pattern of FIG. 4b. The printing plates are then produced by contact exposure with the assembled films in a photographic process. Manual assembly work must be very carefully and exactly carried out since the signatures of the individual inks must be congruent so that no color fringes occur at the image or text edges in the final print and so that the sharpness of the printed images is not deteriorated. It is obvious that manual assembly of the signatures is extremely work-intensive, time-consuming and susceptible to error as well.

The production of a PostScript description of the entire signature is standard as an electronic assembly method for signatures in the prior art. For that purpose, the PostScript data of all pages are collected in a preliminary process on a computer (server), and, when the are completely present, are linked with PostScript data for the register marks, fold/cut mark and print control strips to form an extensive file of PostScript data for the entire signature. A respective PostScript file is usually generated for each ink and for each side of the paper sheet. In the example of the 16-page brochure, 8 PostScript files thus arise for the 8 signatures (respectively 4 inks for the obverse and the reverse). These PostScript files are then interpreted in the RIP, screened and exposed in a large-format recorder on films having the size of the signatures or directly on printing plates.

It is also standard to mix both methods, for example the PostScript assembly of respectively half of a signature and the manual assembly of the two halves to form an entire signature. On the one hand, a recorder (expensive) with a very large exposure format is not required; on the other hand, however, the manual assembly work is greatly simplified.

PostScript assembly of the signatures also has disadvantages. First, the PostScript data for a signature can be extremely extensive and complex, so that a very high-performance and, thus, expensive computer is required in the RIP for the interpretation. Since the individual printed pages are often produced by used programs from different manufacturers (text processing, graphic design and image processing programs), it can occur that the PostScript data of some pages cannot be correctly processed by the interpreter in the RIP or that the RIP even freezes up during the exposing. This is the case when the manufacturers of the user programs have not exactly adhered to the rules of the PostScript page description language. This is more critical in exposing signatures than when exposing single pages since the signature exposing can only be started when all pages are finished. This, however, often occurs only shortly before that start of printing, so that there is no more time to search for the error.

There would also fundamentally be the possibility of having the individual pages interpreted and screened by the RIP and by not immediately forwarding the bit map data thereby generated to the recorder for exposure but, for example, to intermediately store them on a disk storage. The bit map data of all pages could then be operated in a computer (server) according to the imposition pattern to form a bit map dataset for the entire signature and then be subsequently exposed. Such a system is disclosed in published application DE 40 26 321 A1, whereby images are screened and stored as compressed bit map data. This solution, however, is not practical for higher exposure resolutions as required for the recording of printer's copies since the memory for the signature bit map becomes extremely large and expensive. A memory requirement of 3109 Mbytes per signature derives for a printing plate having the size 70 cm×100 cm and a resolution of 2666 pixels/cm horizontally (6772 dpi; dpi=dots per inch) and 1333 lines/cm vertically (3383 dpi). A storage space of 24876 Mbytes is then required for the 8 signatures of the 16-page brochure. Hard disks are also eliminated as a storage medium since they cannot read out the bit map data with the required recorder data rate of 100 to 200 Mbits/s.

Due to the high memory requirement for the finished bit map of a signature, the bit map of a signature cannot be intermediately stored in the previous procedure for the assembly of PostScript data. When the same signature is to be exposed again, for example because the film exposed first or the printing plate was damaged, the entire processing sequence from the interpretation of the Post Script data up to the exposure must be run through again. This costs additional time and occupies the RIP that could already process a new signature during this time. For the same reason, the additional exposure of the signature on a proof output device in the previous procedure again requires the entire run of the PostScript data through the RIP and therefore costs unnecessary time. This is a further disadvantage of the assembly of PostScript data in the prior art.

SUMMARY OF THE INVENTION

It is therefore an object of the present invention to avoid the aforementioned disadvantages and disclose a method with which compressed and overlap-free contone maps (delta lists) of the printed pages are generated with little memory outlay and are decompressed at high speed during the rastering and exposure and assembled to form a signature.

This enables the cost-beneficial intermediate storing of the printed pages and the exposing of signature films and proof outputs of the stored contone maps without having to interpret the PostScript data anew each time.

The compression of the contone maps enables the conversion in screened bit map data at high speed and without intermediately storing the entire signature and enables the exposing without a start/stop mode of the recorder.

This object is achieved by employing a new data format for contone maps that is also referred to as a delta list. The PostScript page descriptions of the individual printed pages are first converted into contone maps by an interpreter and are subsequently compiled line-by-line to an overall contone map of the signature during the screening and exposing.

The invention is described in greater detail below with reference to FIGS. 1 through 7.

DESCRIPTION OF THE PREFERRED EMBODIMENTS

Generalities

German patent application of the assignee "Method For Generating a Contone Map" corresponding to U.S. Ser. No. 08/737,892 filed Feb. 19, 1997, pending discloses the generation of a contone map (delta list) in detail. This shall therefore be only explained to such an extent here as required for an understanding of the inventive method for assembling a signature on the basis of contone maps (delta lists) of the individual printed pages.

A contone map describes a reproducible printer's copy in the form of gray scale values in which a gray scale value is allocated to each pixel. The contone map is generated from the page description data (PostScript data) of the printed page to be reproduced. The gray scale values of the contone map can be directly employed for the control of the recorder when the recording process can reproduce continuous tonal values such as, for example, a proof output means. For recording processes that can only reproduce two tonal values (white or, respectively, black), the gray scale values are converted into raster points before the recording in a raster generator that precedes the recorder, the gray scale values being simulated for the eye therewith. In the recorder, the printers copies are exposed onto the recording material pixel-by-pixel and line-by-line with at least one exposure beam. During the exposure, control signal values determine which pixels are exposed as parts of the raster points or not in that the control signal values correspondingly switch the exposure beam on and off.

For editing the delta list, the superimpositions of the objects in the display list (FIG. 3) are suitably eliminated and the data are subsequently compressed as highly as possible. The delta list is free of overlap because it only contains objects that adjoin one another and do not overlap. There is only one gray scale value for each pixel in the delta list. A compromise between a high compression factor, a fast compression and, above all, a very fast decompression must be found in the selection of the compression method.

The delta list essentially contains simple graphic objects and raster information that can be converted into bit map data and output by a raster generator keeping pace with the recorder speed.

The generation of the delta list and the screening can be implemented with different resolutions. An advantageous version is the calculation of the objects in the delta list with 666.5 pixels/cm (1693 dpi) and the screening of the gray scale values with 1333 pixels/cm (3386 dpi). The screening can also ensue asymmetrically, for example with 2666 pixels/cm (6772 dpi) in line direction and 1333 pixels/cm (3386 dpi) perpendicular to the line direction.

The format of the delta list is byte-oriented. Each byte is a command that is followed by data bytes in some instances. The coding of the commands is selected such that an optimally great compression of the data is achieved. General information, for example the length of the delta list and the length of a scan line, are located at the start of every delta list. The delta list also contains information about the screening method according to which the objects are to be converted into bit maps by the raster generator.

Figure 5:
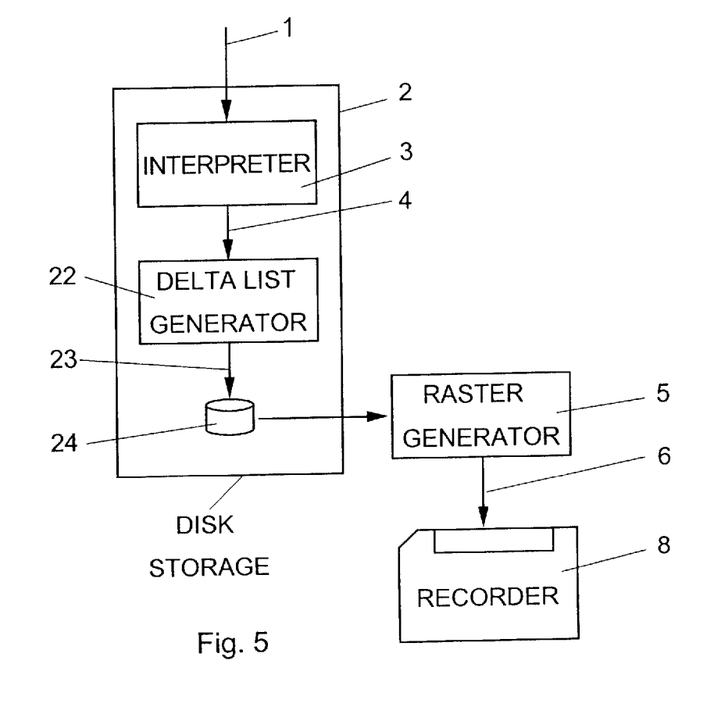
FIG. 5 shows the work execution given the exposing of PostScript data with the generation and further-processing of the delta list.

FIG. 5 shows an improved work sequence for the interpretation and exposure of PostScript data, whereby a contone map in the data format of the delta list is generated. The PostScript data 1 that describe the content of the printer's copy are supplied to the RIP (2) where, in a first step, they are analyzed by the interpreter 3 and converted into a display list 4, as was already explained above. In a second step, a delta list generator 22 generates the overlap-free contone map of the delta list (23) from the display list, and this is stored, for example, on a disk storage (24). When individual printed pages are to be exposed, the stored delta lists of the printer's copies, for example the various color separations of a printed page, are successively called from the disk storage 24 at a later time, are converted into bit maps 6 by the raster generator 5 and are exposed in the recorder 8. The screening of the delta list ensues keeping pace with the recorder speed.

Since very different page contents with different properties with respect to the compression can occur in different parts of a printed page, the printed page is divided into horizontal strips (bands) in the generation of the delta list and these bands are further subdivided into successive sections (zones). Respectively optimized compression methods can then be applied in the bands and zones.

Figure 6:
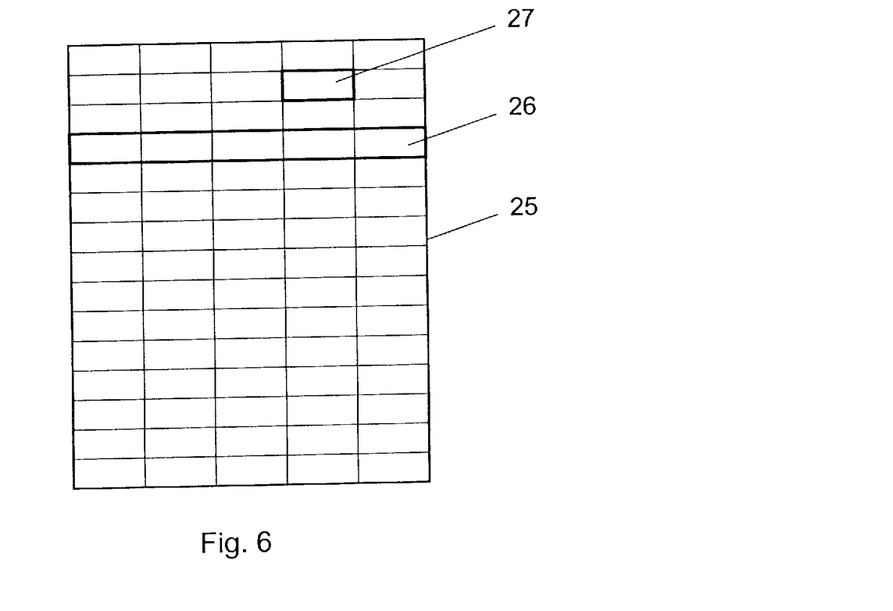
FIG. 6 shows the subdivision of a printer's copy into bands and zones.

FIG. 6 shows the division of a printer's copy 25 into bands 26 and zones 27. The height of the bands and the width of the zones is arbitrary; however, it is advantageous for the processing when the bands are all of the same height and the zones are all of the same width. It is also advantageous when the band height and the zone width are powers of 2.

Since large parts of the information on a printed page are often composed of few different gray scale values, for example only of black/white information (text), gray scale values in the delta list are encoded with different numbers of bits, for example 1-bit gray scale value for black/white information and 8 bits per gray scale value for contone information. This measure likewise contributes to the compression of the delta list.

The compression of the data in the inventive data format of the delta list is based on the run length method that is modified for the specific demands. Command bytes that can be accompanied by a run length and/or one or more gray scale values exist in the data stream. The compression also considers repetitions of the entire content of a zone in Y-direction (X-direction=principal scanning direction; Y-direction=secondary scanning direction). A few delta list commands and their encoding that are important for understanding the generation of the delta list are explained by way of example in the following table.

Start of a new band:

LHD_BAND  $\dfrac{\text{Byte 0}}{0000\ 0001}$

Start of a new line in the band:

LHD_START  $\dfrac{\text{Byte 0}}{0000\ 0001}$

Start of a new zone in the line:

LHD_ZONE  $\dfrac{\text{Byte 0} \quad \text{Byte 1} \quad \text{Byte 2}}{0000\ 0010 \quad \text{Y-cmpr} \quad \text{bits}}$ Y-cmpr = number of repetitions in Y-direction
bits = number of bits per gray scale value (1, 8, 12)

Selection of a screening method:

LHD_SCREEN | Byte 0 | Byte 1 |
| --- | --- |
| 0000 1000 | index | index = number of the screening method for the following gray scale values

Short run length:

LHD_REPEATS | Byte 0 | Byte 1 |
| --- | --- |
| 01nn nnnn | gray scale value |

The gray scale value is repeated (nnnnnn+1) times.

Long run length:

LHD_REPEAT | Byte 0 | Byte 1 | Byte 2 |
| --- | --- | --- |
| 001n nnnn | kkkk kkkk | gray scale value |

The gray scale value is repeated ([nnnn]×256+[kkkk kkkk]+1) times.

Uncompressed data:

LHD_UCDATA | Byte 0 | Byte 1 | Byte 2 | ..... |
| --- | --- | --- | --- |
| 001n nnnn | gray scale value 1 | gray scale value 2 | ..... |

(nnnnn+1) uncompressed gray scale values follow.

---

The first byte or, respectively, the first bits in the first byte of each command are an indication of the command that is involved and of how many bytes with parameters for the command follow. This structure assures that each command can be unambiguously recognized and correctly interpreted in the decoding of the delta list.

Each new band is initiated with the command LHD_BAND and each new line within the band is initiated with the command LHD_START. The command LHD_ZONE wherein the number of lines over which the content of this zone repeats in Y-direction is encoded with the parameter "Y-cmpr" stands at the start of every zone in the line. The parameter "bits" indicates the number of bits with which the gray scale values are encoded within the zone, for example 1 bit for black/white information, 8 bits for contone information with normal graduation (256 steps) and 12 bits for contone information with finer graduation (4096 steps).

A screening method that is identified by the parameter "index" is selected with the command LHD_SCREEN. The raster generator should screen all following gray scale values in the delta list with the selected screening method until a new screening method is selected again. The parameters of the screening method such a screen width, screen angle, raster dot shape are stored under the number "index" in the raster generator or they are attached to the generated delta list with further delta list commands.

A run length of repeating gray scale values within a zone is described with the commands LHD_REPEATS or LHD_REPEAT. In the command LHD_REPEATS, a 6-bit binary number [nnnnnn] in the first byte encodes a run length between 1 and 64; a run length between 1 and 4096 is encoded in the command LHD_REPEAT by a 12-bit binary number ([nnnn] in the first byte and [kkkk kkkk] in the second byte). The last byte of this command respectively indicates the gray scale value that should be repeated.

When successive gray scale values in the line are not the same and can therefore not be compressed with a run length, such a sequence is described with command LHD_UCDATA. A 5-bit binary number [nnnnn] in the first byte indicates how many uncompressed gray scale values follow.

In the generation of the delta list, the lines of a band are processed from top to bottom and the zones of a line are processed from left to right. The generated commands and run lengths are thereby joined to one another tightly packed, i.e. nothing is entered in the delta list for the zones for which no run lengths are generated. As a result of the code for the compression in Y-direction in the command LHD_ZONE, the raster generator can decode the delta list such that the run lengths are again allocated to the correct zones.

The Assembling of Delta Lists

It was explained above that individual printed pages in the delta list format can be directed supplied to the raster generator 5, decompressed and screened thereat and forwarded to the recorder for exposing. When, however, entire signatures with a plurality of printed pages are exposed, then the delta lists of all printed pages and of all auxiliary elements (register marks, etc.) in a memory are made available to the raster generator in the inventive method. In addition, a data structure that defines the paper sheet (sheet definition) is deposited in the memory, and a data structure that defines the printed page or, respectively, the auxiliary element (delta definition) is deposited in the memory for each printed page and each auxiliary element. The sheet definition contains all information needed for the recording of the signature, such as dimensions of the signature position on the exposure surface of the recorder resolution of the RIP resolution of the recorder positive/negative exposure identification of the recording material information for punching fitting holes identifier for the identification of the signature.

The delta definitions of the printed pages or, respectively, auxiliary elements contain information such as dimensions of the printed page or, respectively, auxiliary element position on the signature reference to the identifier of the appertaining signature reference to the appertaining delta list identifier for the identification of the delta definition.

Figure 7A:
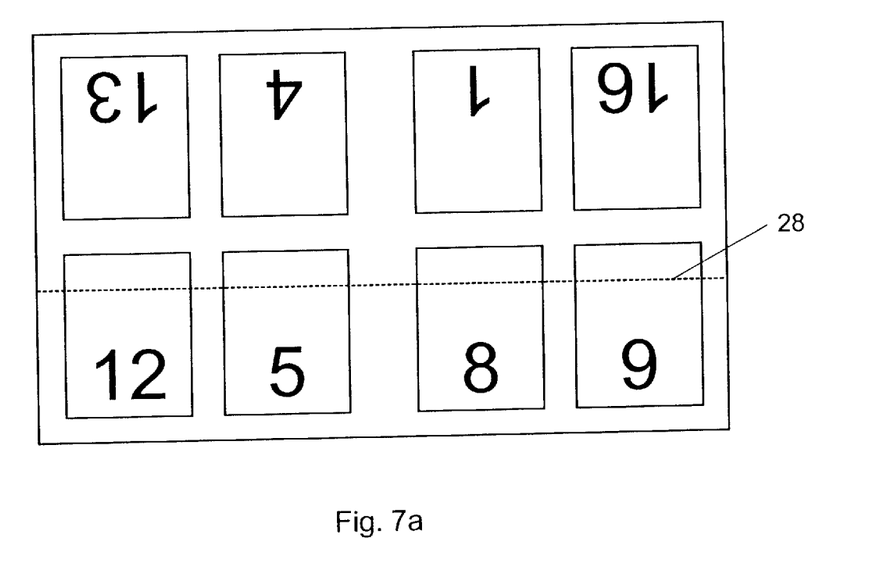
FIGS. 7A–7B show the assembly of delta lists to form a signature.
Figure 7B:
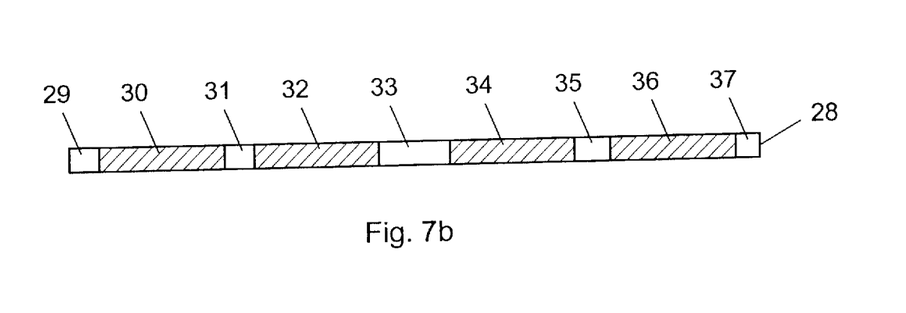

The execution of the assembling in the raster generator 5 during the screening and exposure is now explained with reference to the example of a simplified imposition pattern (without auxiliary elements), as shown in FIG. 7a. The raster generator assembles the signature line by line and then immediately screens and exposes each assembled line. Which printed pages and auxiliary elements contribute to the structure of the line for a line 28 to be exposed is determined from the particulars in the signature definition and in the delta definitions. These are the printed pages 12, 5, 8, 9 for the line 28. Which line segments from the appertaining delta lists must be inserted into the line to be assembled is likewise determined from the position particulars in the delta definitions. The corresponding excerpts are fetched from the delta lists, decompressed and inserted into the current line 28. FIG. 7b shows the structure of the line 28 again. A white line section (29) (i.e. a line section that is not to be exposed) from printed page 12 is inserted from the left edge up to the beginning of the line segment 30. The line segments (32, 34, 36) from the delta lists of the remaining pages 5, 8, 9 are inserted in conformity with their position in the line 28, and the interspaces are filled with the white sections 31, 33, 35, 37. The assembled line 28 is subsequently screened and forwarded to the recorder for exposure. The next line is then assembled, etc.

The electronic assembly of signatures is implemented in this way during the screening and exposing. As a result thereof, it is not necessary to intermediately store the assembled, whole signatures before the screening and exposing. The memory requirement is additionally limited due to the assembling on the basis of compressed delta lists. All said problems in the interpretation of extremely large and complex PostScript files are also avoided by employing delta lists instead of PostScript data for the assembling.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for electronic assembly of signatures, wherein individual printed pages are assembled to form a signature, comprising the steps of:

describing contents of the printed pages to be assembled in a page description language;

generating contone maps in which the printed pages are described pixel-by-pixel and line-by-line in the form of gray scale values for the individual printed pages by interpretation of page descriptions in at least one interpreter;

assembling the contone maps of the individual printed pages to form an overall contone map in a raster generator such that lines of the overall contone map of the signature are composed from individual lines of the contone maps of the printed pages taking predetermined parameters into consideration;

converting the overall contone map of the signature into a screened bit map in the raster generator; and recording the signature pixel-by-pixel and line-by-line on a recording material based on the bit map.

2. The method according to claim 1 wherein the predetermined parameters in the raster generator are a definition of the signature and a definition of the contone map for each printed page to be assembled;

the definition of the signature contains a signature identifier and information required for the assembly of the signature; and the definition of the contone map contains a corresponding contone map identifier and further information for assembly.

3. The method according to claim 1 wherein a plurality of signature definitions corresponding to a plurality of color separations are predetermined in the raster generator for recording color separations.

4. The method according to claim 1 wherein the overall contone map of the signature is not intermediately stored.

5. The method according to claim 1 wherein contone maps of auxiliary elements selected from the group consisting of register marks, fold marks, cut marks, and print control strips are assembled with the contone maps of the printed pages to form the overall contone map of the signature.

6. The method according to claim 1 wherein, for generating a contone map of a printed page:

a programmed page description of a content of the printed page, composed of text, graphic and image information, is processed by an interpreter and a list of graphic objects is generated;

the objects are superimposed according to their position on the printed page;

pixels are generated for the objects; and the pixels are combined to form the contone map.

7. The method according to claim 1 wherein the contone map is data-compressed according to a run length coding.

8. The method according to claim 1 wherein the contone map is data-compressed by reducing a number of bits per gray scale value.

9. The method according to claim 1 wherein the contone map is data-compressed by difference coding between gray scale values of neighboring pixels.

10. A method for electronic assembly of signatures, wherein individual printed pages are assembled to form a signature, comprising the steps of:

describing contents of the printed pages to be assembled in a page description language;

generating contone maps in which the printed pages are described in the form of gray scale values for the individual printed pages by interpretation of page descriptions in at least one interpreter;

assembling the contone maps of the individual printed pages to form an overall contone map in a raster generator such that lines of the overall contone map of the signature are composed from individual lines of the contone maps of the printed pages;

converting the overall contone map of the signature into a screened bit map in the raster generator; and recording the signature on a recording material based on the bit map.

* * * * *